(12) United States Patent
Lee et al.

(10) Patent No.: US 7,903,401 B2
(45) Date of Patent: Mar. 8, 2011

(54) HARD DISK DRIVE HOLDING APPARATUS

(75) Inventors: Jen-Hsiang Lee, Taipei (TW); Po-Li Hsieh, Yunlin Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 285 days.

(21) Appl. No.: 12/155,234

(22) Filed: May 30, 2008

(65) Prior Publication Data

US 2009/0167124 A1    Jul. 2, 2009

(30) Foreign Application Priority Data

Dec. 31, 2007   (TW) ............................... 96222650 U

(51) Int. Cl.
*G06F 1/16* (2006.01)
*H05K 5/00* (2006.01)
*H05K 7/00* (2006.01)

(52) U.S. Cl. ................................................. 361/679.33

(58) Field of Classification Search .............. 361/679.33
See application file for complete search history.

(56) References Cited

U.S. PATENT DOCUMENTS

| 5,886,869 A * | 3/1999 | Fussell et al. ............ 361/679.31 |
| 6,473,313 B1 * | 10/2002 | Chen et al. .................... 361/801 |
| 7,688,577 B2 * | 3/2010 | Wang ........................ 361/679.35 |
| 2008/0037211 A1 * | 2/2008 | Martin et al. ................. 361/685 |

* cited by examiner

*Primary Examiner* — Jayprakash N Gandhi
*Assistant Examiner* — Adrian S Wilson
(74) *Attorney, Agent, or Firm* — Rabin & Berdo, PC

(57) ABSTRACT

A hard disk drive holding apparatus comprising a support, positioning pins, securing pins and swivel arms. The support comprises a supporting surface and side panels. The side panels have holes located thereon and are erected on the supporting surface. The positioning pins are located on the supporting surface to be inserted into the positioning holes on the bottom of the hard disk drive. The securing pins pass through the holes on the side panels and engage into the securing holes on the sides of the hard disk drive. The swivel arms are attached to the securing pins and pivotally connected on the support.

16 Claims, 3 Drawing Sheets

US 7,903,401 B2

HARD DISK DRIVE HOLDING APPARATUS

RELATED APPLICATIONS

This application claims priority to Taiwan Application Serial Number 96222650, filed Dec. 31, 2007, which is herein incorporated by reference.

FIELD OF THE INVENTION

The present invention relates to a holding apparatus, and more particularly to a hard disk drive holding apparatus.

BACKGROUND OF THE INVENTION

In today's information technology era, computers are already a necessary product of people's lives. Whether it is a personal computer or a computer used by an industry, a hard disk drive used to save data is generally installed in computers.

Many hard disk drives installed in current computers use screws to lock and secure onto a holding apparatus. This securing method can reliably secure a hard disk drive, but hand tools must be used to install or detach a hard disk drive, thus causing the inconvenience of installing or detaching the hard disk drive. Moreover, by using the aforementioned method to secure the hard disk drive, problems of rusted screws resulting in less convenient detachment of a hard disk drive generally are encountered. Therefore, a holding apparatus for a hard disk drive with convenient installation and detachment is needed.

SUMMARY OF THE INVENTION

It is an object of the present invention to provide a hard disk drive holding apparatus.

According to an embodiment of the present invention, a hard disk drive holding apparatus is provided. The hard disk drive holding apparatus comprises a support, positioning pins, swivel arms, securing pins and latches. The support comprises a supporting surface and side panels. The side panels have holes located thereon and are erected on the supporting surface. The positioning pins are located on the supporting surface to be inserted into the positioning holes on the bottom of the hard disk drive. The swivel arms are pivotally connected on the support to rotate relatively to the side panels of the support. The securing pins are located on the swivel arms, and when the swivel arms rotate to the side panels of the support, the securing pins pass through the holes on the side panels and engage into the securing holes on the sides of the hard disk drive. The latches are used to latch the swivel arms and the support when the securing pins engage into the securing holes.

According to another embodiment of the present invention, a hard disk drive holding apparatus is provided. The hard disk drive holding apparatus comprises a support, positioning pins, securing pins and swivel arms. The support comprises a supporting surface and side panels. The side panels have holes located thereon and are erected on the supporting surface. The positioning pins are located on the supporting surface to be inserted into the positioning holes on the bottom of the hard disk drive. The securing pins pass through the holes on the side panels and engage into the securing holes on the sides of the hard disk drive. The swivel arms are attached to the securing pins and pivotally connected on the support.

The aforementioned hard disk drive holding apparatus of the embodiments of the present invention is capable of restricting the movement of the hard disk drive in all three directions and achieves the purpose of securing the hard disk drive. Furthermore, installation and detachment of a hard disk drive can be completed without the need for hand tools when the user uses the aforementioned hard disk drive holding apparatus, thereby increasing the convenience of the user.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE PREFERRED EMBODIMENT

Figure 1:
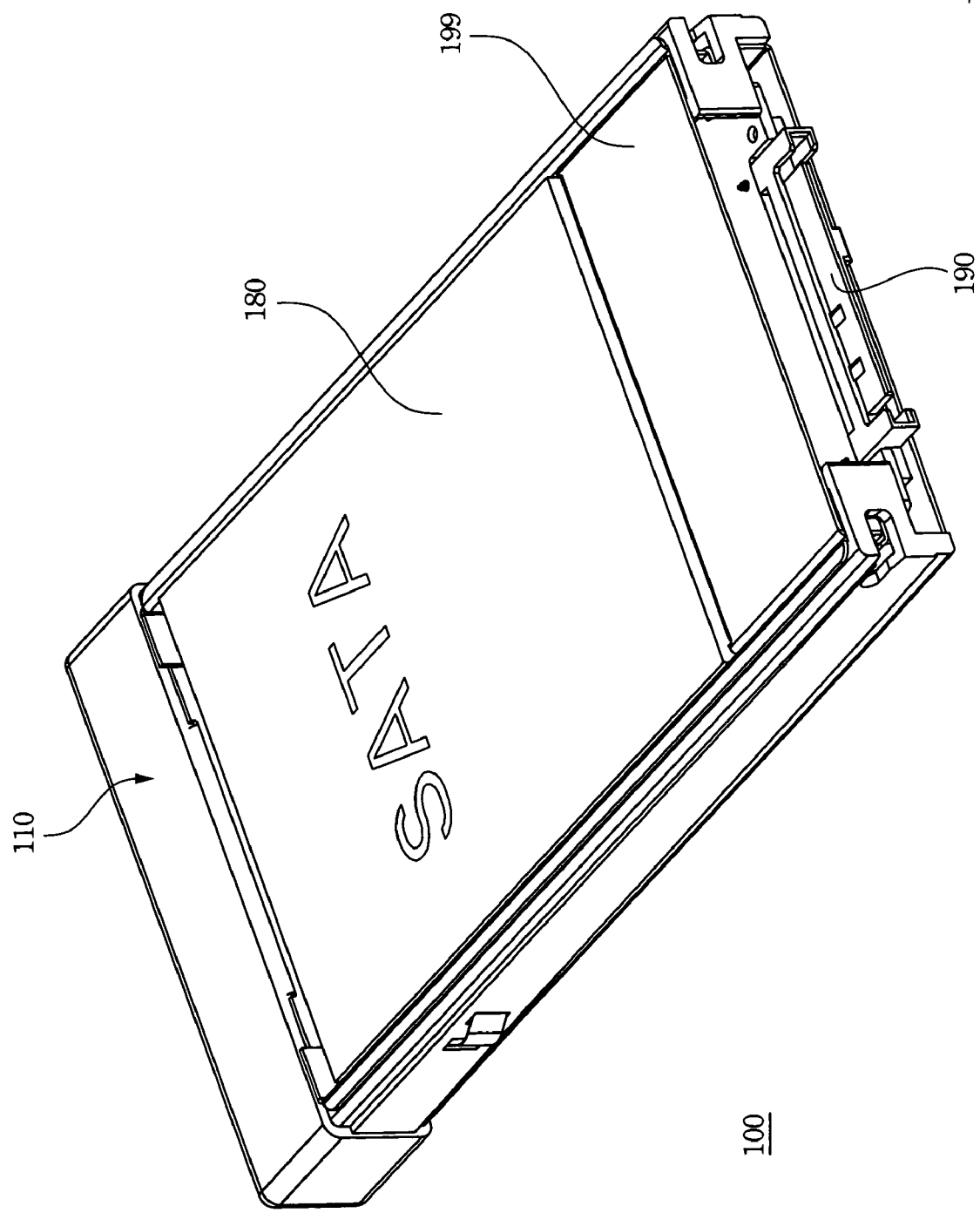
FIG. 1 shows a perspective view of a hard disk drive module according to an embodiment of the present invention.
Figure 2:
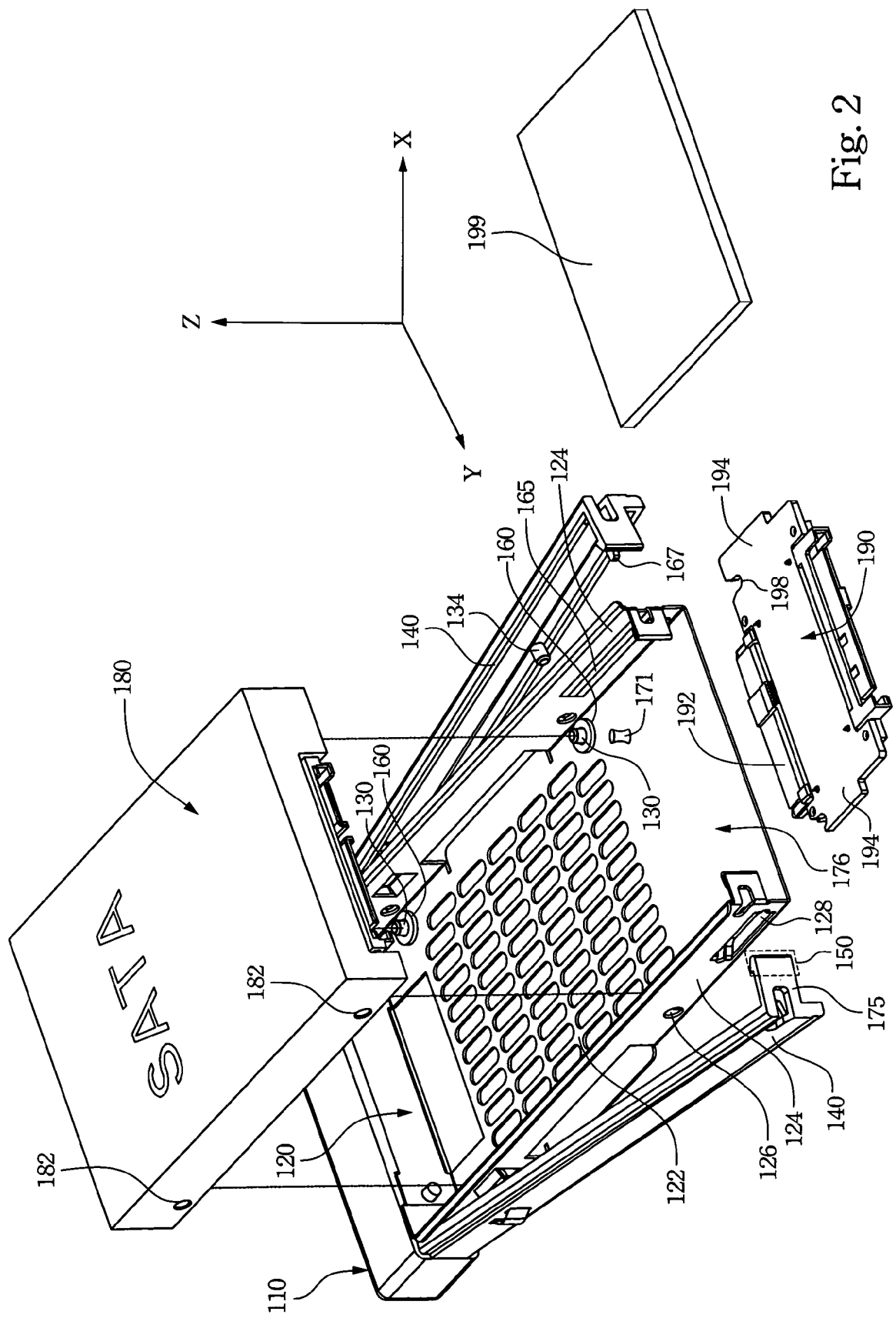
FIG. 2 shows an exploded view of the elements of the hard disk drive module in FIG. 1.

FIG. 1 shows a perspective view of a hard disk drive module 100 according to an embodiment of the present invention. FIG. 2 shows an exploded view of the elements of the hard disk drive module 100 in FIG. 1. The hard disk drive module 100 comprises a hard disk drive holding apparatus 110, a hard disk drive 180, an adapter card 190 and a metallic plate 199. The hard disk drive 180 is secured on the hard disk drive holding apparatus 110. One end of the adapter card 190 is attached to the hard disk drive 180. The metallic plate 199 covers the top of the adapter card 190 for grounding to shelter the electromagnetic waves emitted by the adapter card 190.

Referring to FIG. 2, the hard disk drive holding apparatus 110 comprises a support 120, positioning pins 130, securing pins 134 and swivel arms 140. The support 120 comprises a supporting surface 122 and side panels 124. The side panels 124 have holes 126 located thereon and are erected on the supporting surface 122. The positioning pins 130 are located on the supporting surface 122 to be inserted into the positioning holes (not shown) on the bottom of the hard disk drive 180, and to restrict movement of the hard disk drive 180 on axis X and axis Y. The securing pins 134 pass through the holes 126 of the side panels 124 to engage into the securing holes 182 on the side surface of the hard disk drive 180 and restrict the movement of the hard disk drive 180 on axis Z. The swivel arms 140 are attached to the securing pins 134 and pivotally connected on the support 120.

Specifically, the swivel arms 140 may rotate relative to the side panels 124 of the support 120. When the swivel arms 140 rotate to contact the side panels 124, the securing pins 134 on the swivel arms 140 engage into the securing holes 182. It should be noted that the embodiment of the present invention does not limit the swivel arms 140 to necessarily contact the side panels 124. Whether or not the swivel arms 140 contact the side panels 124, when the securing pins 134 on the swivel arms 140 are engaged into the securing holes 182, the movement of the hard disk drive 180 can be restricted on axis Z.

In the aforementioned hard disk drive holding apparatus 110, the positioning pins 130 and the securing pins 134 are capable of restricting the movement of the hard disk drive 180 in all three directions on axis X, Y and Z, and achieve the purpose of securing the hard disk drive 180. Moreover, the placement of the swivel arms 140 enables users to insert or remove the securing pins 134 into or from the securing holes 182 on the hard disk drive 180 by rotating the swivel arms 140 to complete installation and detachment of the hard disk drive 180. The aforementioned installation and detachment of the hard disk drive 180 can be completed without the need for hand tools, thus the convenience of the user is increased.

Referring again to FIG. 2, the aforementioned hard disk drive holding apparatus 110 may further comprise latches 150. When the securing pins 134 on the swivel arms 140 engage into the securing holes 182, the latches 150 may further latch the swivel arms 140 and the support 120.

Generally, other than securing the hard disk drive 180 for the design of the hard disk drive holding apparatus 110, an anti-vibration or dampening design is further considered to prevent data corruption in the hard disk drive 180 when under excessive vibrations. To achieve the aforementioned anti-vibration or dampening design, the hard disk drive holding apparatus 110 may have dampers 160 on the supporting surface 122 of the support 120. More specifically, the dampers 160 may be disposed around the positioning pins 130.

Figure 3:
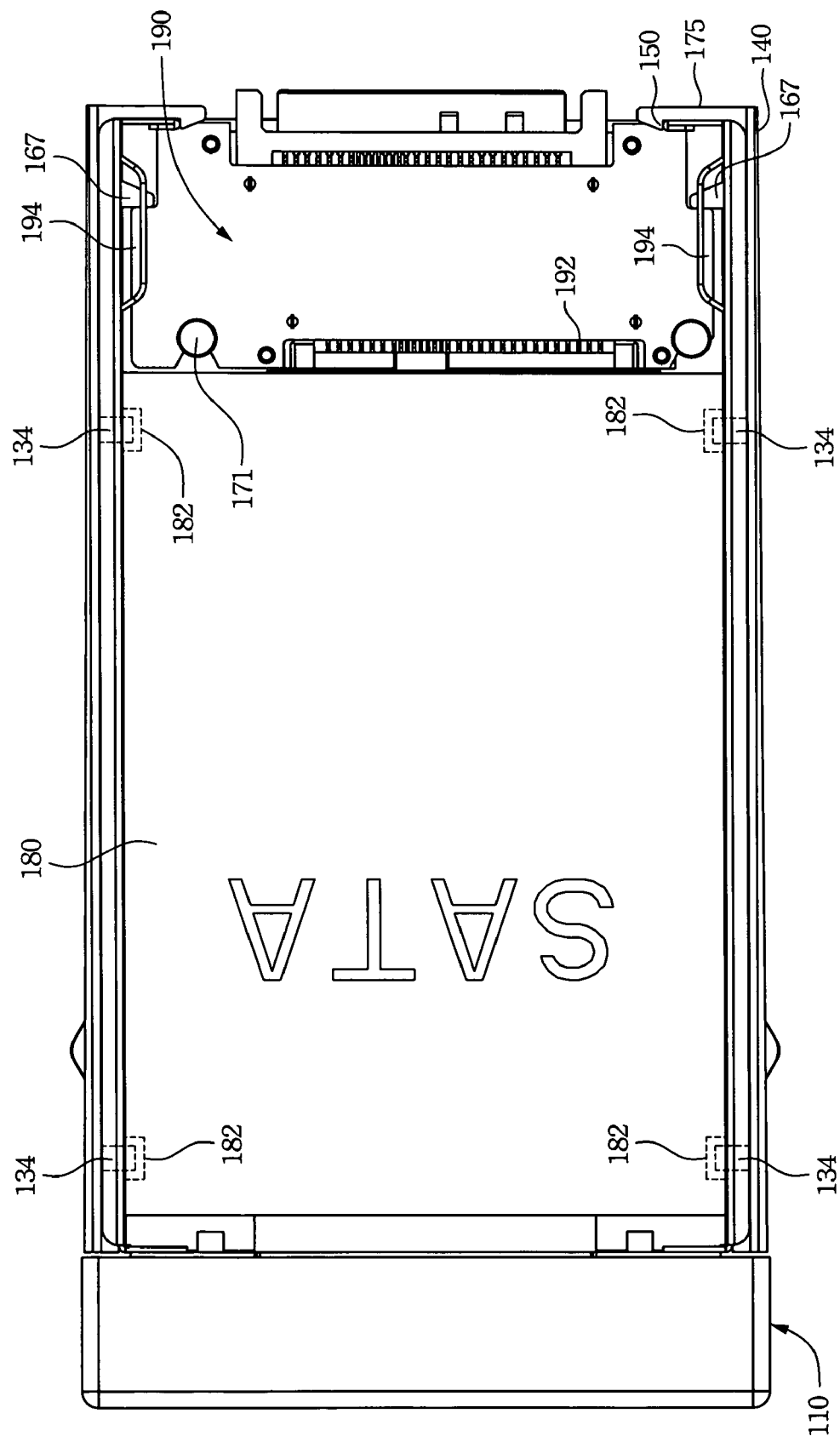
FIG. 3 shows a top view of the hard disk drive module in FIG. 1 after removing the metallic plate.

Referring again to FIG. 2, a side of the support 120 may have an adapter card inlet 176 interposed between the two side panels 124. The adapter card 190 may be installed onto the hard disk drive 180 though the adapter card inlet 176. Refer to FIG. 3 for the installed adapter card 190, wherein FIG. 3 shows a top view of the hard disk drive module 100 in FIG. 1 after removing the metallic plate 199.

Referring to both FIG. 2 and FIG. 3, the two side panels 124 of the hard disk drive holding apparatus 110 each have a rail 165, wherein the rails 165 on both side panels 124 are opposite to each other and parallel. In addition to the pin 192 attached to the hard disk drive 180, the two sides 194 of the adapter card 190 can each be received into the rails 165. Accordingly, the adapter card 190 is prevented from rocking on axis Z.

Other than the aforementioned method to secure the two sides 194 of the adapter card 190 into the rails 165, the two sides 194 of the adapter card 190 may both abut against the stopping ribs 167 to improve the secureness of the adapter card 190. The stopping ribs 167 may be on the swivel arms 140, and through holes 128 are provided on the side panels 124. When the securing pins 134 engage into the securing holes 182 of the hard disk drive 180 (or when the latches 150 latch the swivel arms 140 and the support 120), the stopping ribs 167 pass through the through holes 128 and abut against the edges of the adapter card 190.

Furthermore, to accurately install the adapter card 190 onto the hard disk drive 180, the supporting surface 122 of the hard disk drive holding apparatus 110 may be provided with an adapter card positioning rod 171, and a locating slot 198 may be provided on the adapter card 190. When installing the adapter card 190, the adapter card positioning rod 171 can fit into the locating slot 198 on the adapter card 190.

Referring again to both FIG. 2 and FIG. 3, the hard disk drive module 100 may further comprise shielding boards 175, wherein the shielding boards 175 and the swivel arms 140 are connected. When the securing pins 134 engage into the securing holes 182 of the hard disk drive 180 (or when the latches 150 latch the swivel arms 140 and the support 120), the shielding boards 175 cover a portion of the adapter card inlet 176 to abut against the adapter card 190 to improve the secureness of the adapter card 190.

It will be apparent to a person skilled in the art, the foregoing preferred embodiments of the present invention are illustrated of the present invention rather than limiting of the present invention. It is intended to cover various modifications and similar arrangements included within the spirit and scope of the appended claims. Therefore, the scope of which should be accorded the broadest interpretation so as to encompass all such modifications and similar structure.

What is claimed is:

1. A hard disk drive holding apparatus, comprising:
   a support comprising:
      a supporting surface; and
      at least a side panel erected on the supporting surface and having at least a hole on the side panel, the side panel further having a through hole;
   at least a positioning pin located on the supporting surface to be inserted into at least a positioning hole on a bottom of a hard disk drive;
   a swivel arm pivotally connected to the support to rotate relative to the side panel of the support;
   at least a securing pin located on the swivel arm to pass through the hole on the side panel and engage into at least a securing hole on a side surface of the hard disk drive when the swivel arm rotates to be against the side panel of the support;
   a latch to latch the swivel arm and the support when the securing pin engages into the securing hole; and
   a stopping rib located on the swivel arm and passing through the through hole and abutting against an edge of an adapter card when the latch latches the swivel arm and the support.

2. The hard disk drive holding apparatus according to claim 1, further comprising at least a damper located on the supporting surface of the support.

3. The hard disk drive holding apparatus according to claim 2, wherein the damper is disposed around the positioning pin.

4. The hard disk drive holding apparatus according to claim 1, wherein the side panels are a pair, each erected on opposite sides of the supporting surface, and each of the side panels has a rail, wherein the rails are opposite to and in parallel with each other to respectively receive both sides of the adapter card.

5. The hard disk drive holding apparatus according to claim 1, wherein the side panels are a pair, each erected on opposite sides of the supporting surface and forming an adapter card inlet between each other, the swivel arm having a shielding board, wherein the shielding board covers a portion of the adapter card inlet when the latch latches the swivel arm and the support.

6. The hard disk drive holding apparatus according to claim 1, further comprising an adapter card positioning rod located on the supporting surface of the support to fit into a locating slot on the adapter card.

7. The hard disk drive holding apparatus according to claim 1, further comprising a metallic plate covering a top of the adapter card, wherein the metallic plate is for grounding to shelter the electromagnetic waves emitted by the adapter card.

8. A hard disk drive holding apparatus, comprising:
   a support comprising:
      a supporting surface; and
      at least a side panel erected on the supporting surface and having at least a hole on the side panel, the side panel further having a through hole;
   at least a positioning pin located on the supporting surface to be inserted into at least a positioning hole on a bottom of a hard disk drive;
   at least a securing pin passing through the hole on the side panel, and engaging at least a securing hole on the side surface of the hard disk drive;
   a swivel arm attached to the securing pin and pivotally connected to the support; and a stopping rib located on the swivel arm and passing through the through hole and abutting against an edge of an adapter card when the securing pin engages into the securing hole.

9. The hard disk drive holding apparatus according to claim 8, further comprising a latch to latch the swivel arm and the support when the securing pin engages into the securing hole.

10. The hard disk drive holding apparatus according to claim 8, further comprising at least a damper located on the supporting surface of the support.

11. The hard disk drive holding apparatus according to claim 10, wherein the damper is disposed around the positioning pin.

12. The hard disk drive holding apparatus according to claim 8, wherein the side panels are a pair each erected on opposite sides of the supporting surface, and the side panels each have a rail, wherein the rails are opposite to each other and parallel to respectively receive both sides of the adapter card.

13. The hard disk drive holding apparatus according to claim 8, wherein the side panels are a pair, each erected on opposite sides of the supporting surface and forming an adapter card inlet between each other, the swivel arm having a shielding board, wherein the shielding board covers a portion of the adapter card inlet when the securing pin engages into the securing hole.

14. The hard disk drive holding apparatus according to claim 8, further comprising an adapter card positioning rod located on the supporting surface of the support to fit into a locating slot on the adapter card.

15. The hard disk drive holding apparatus according to claim 8, further comprising a metallic plate covering a top of the adapter card, wherein the metallic plate is for grounding to shelter the electromagnetic waves emitted by the adapter card.

16. A hard disk drive holding apparatus, comprising:
a support comprising:
   a supporting surface; and
   a pair of side panels erected on the supporting surface and having at least a hole on the side panels, the side panels being erected on opposite sides of the supporting surface and forming an adapter card inlet between each other;
at least a positioning pin located on the supporting surface to be inserted into at least a positioning hole on a bottom of a hard disk drive;
at least a securing pin passing through the hole on the side panel, and engaging at least a securing hole on the side surface of the hard disk drive; and
a swivel arm attached to the securing pin and pivotally connected to the support, the swivel arm having a shielding board, the shielding board covering a portion of the adapter card inlet when the securing pin engages into the securing hole.

* * * * *